(12) United States Patent
Meeks

(10) Patent No.: US 7,464,978 B1
(45) Date of Patent: Dec. 16, 2008

(54) PICKUP TRUCK TOOLBOX WITH AN EXTENSIBLE PLATFORM

(76) Inventor: Carl D. Meeks, 1070A Highway 112, La Jara, NM (US) 87027

( * ) Notice: Subject to any disclaimer, the term of this patent is extended or adjusted under 35 U.S.C. 154(b) by 0 days.

(21) Appl. No.: 12/078,671

(22) Filed: Apr. 3, 2008

(51) Int. Cl.
*B62D 25/00* (2006.01)
(52) U.S. Cl. .................. 296/37.6; 296/26.15; 108/44
(58) Field of Classification Search ............ 296/37.6, 296/26.15, 26.11; 108/44
See application file for complete search history.

(56) References Cited

U.S. PATENT DOCUMENTS

| | | | |
|---|---|---|---|
| 3,826,334 A | 7/1974 | Spillman | |
| 4,188,057 A | 2/1980 | Pauli | |
| 5,090,335 A | 2/1992 | Russell | |
| 5,638,913 A | 6/1997 | Blum | |
| 5,649,734 A * | 7/1997 | Speis | ............ 296/57.1 |
| 6,464,274 B2 | 10/2002 | Mink et al. | |
| 6,662,983 B2 | 12/2003 | Lane et al. | |

* cited by examiner

*Primary Examiner*—Joseph D Pape
(74) *Attorney, Agent, or Firm*—Stephen R. Greiner

(57) ABSTRACT

A toolbox including an enclosure for positioning upon the bed of a pickup truck. The enclosure has a movable lid at its top. A platform is hingedly attached to one of the opposed ends of the movable lid such that the platform can be pivoted outwardly from the side of the pickup truck in a cantilevered manner. The platform has a rigid frame and a perforated panel that is affixed to the top of the frame and a socket member that is affixed to the bottom of the frame. A support rod is releasably attached to the platform for transmitting cantilevered loads to the ground. The top of the support rod is slidably positioned within the socket member.

1 Claim, 2 Drawing Sheets

PICKUP TRUCK TOOLBOX WITH AN EXTENSIBLE PLATFORM

FIELD OF THE INVENTION

The present invention relates generally to fire escapes, ladders, scaffolds and, more particularly, to convertible devices of this sort.

BACKGROUND OF THE INVENTION

To handle fluids flowing at high rates and under high pressure, oilfield equipment is typically large. Workers needing to inspect and repair: wellhead valve assemblies, pumping units, separators, tanks, compressors, and the like, are frequently called upon to access areas well above the height of a man. To gain access, many workers carry ladders in their vehicles as part of their tool kit. Ladders are bulky, however, taking up much room that can be devoted to other productive purposes. Furthermore, depending on size and weight, ladders can be difficult and dangerous for a single worker to lift and move. Thus, oilfield workers must often work inefficiently in larger groups than necessary.

SUMMARY OF THE INVENTION

In light of the problems associated with the use of ladders in oilfields, it is a principal object of the invention to provide a pickup truck toolbox with an extensible platform. The toolbox is easily positioned on the bed of a pickup truck behind the cab and, when needed, the associated platform is extended to provide a horizontal surface upon which a man can stand to access equipment normally out of reach. When no longer required, the platform is retracted to its out-of-the-way storage position.

It is another object of the invention to provide a toolbox of the type described that quickly and easily installed upon the bed of a pickup truck and, after a few minutes of instruction, can be safely operated by one person without resort to any additional tools.

It is an object of the invention to provide improved features and arrangements thereof in a pickup truck toolbox with an extensible platform for the purposes described which is lightweight in construction, inexpensive to manufacture, and dependable in use.

Briefly, the toolbox in accordance with this invention achieves the intended objects by featuring an enclosure for positioning upon the bed of a pickup truck. The enclosure has a movable lid at its top. A platform is hingedly attached to one end of the lid such that the platform can be pivoted outwardly from the side of the pickup truck in a cantilevered manner. A support rod is releasably attached to the platform for transmitting cantilevered loads to the ground.

The foregoing and other objects, features, and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
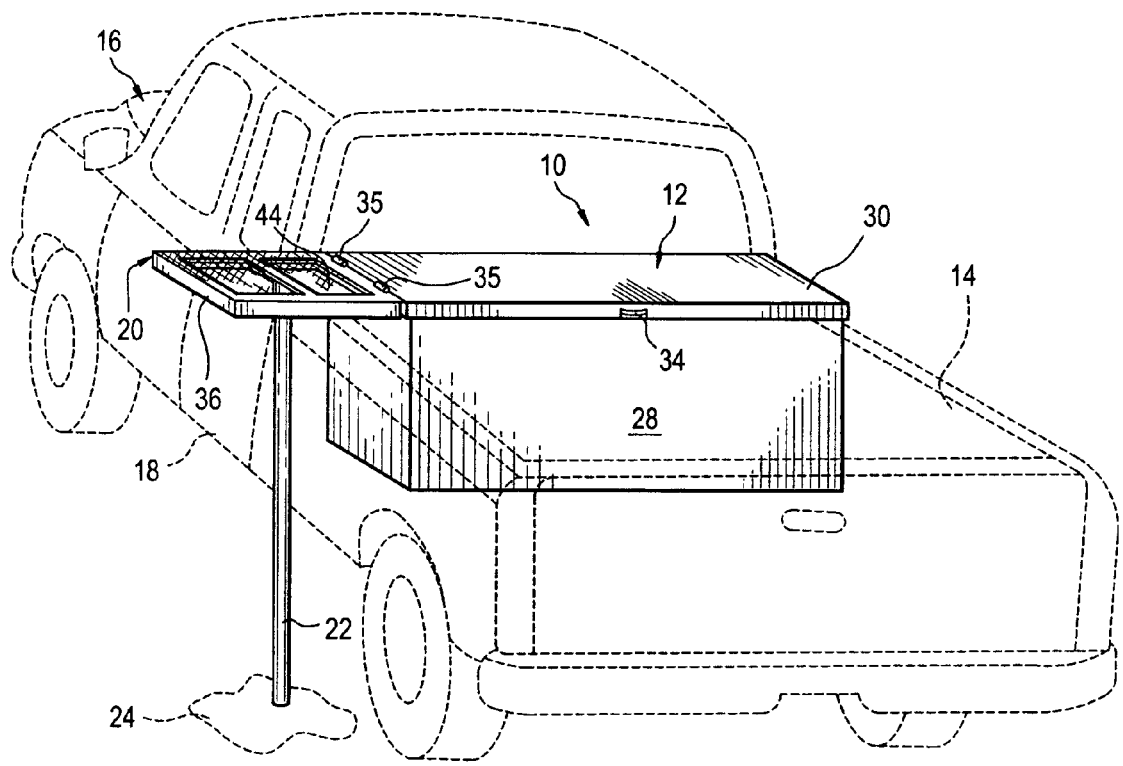
FIG. 1 is a perspective view of a toolbox in accordance with the present invention being located on the bed of a pickup truck and having the platform of the toolbox in an extended position.
Figure 2:
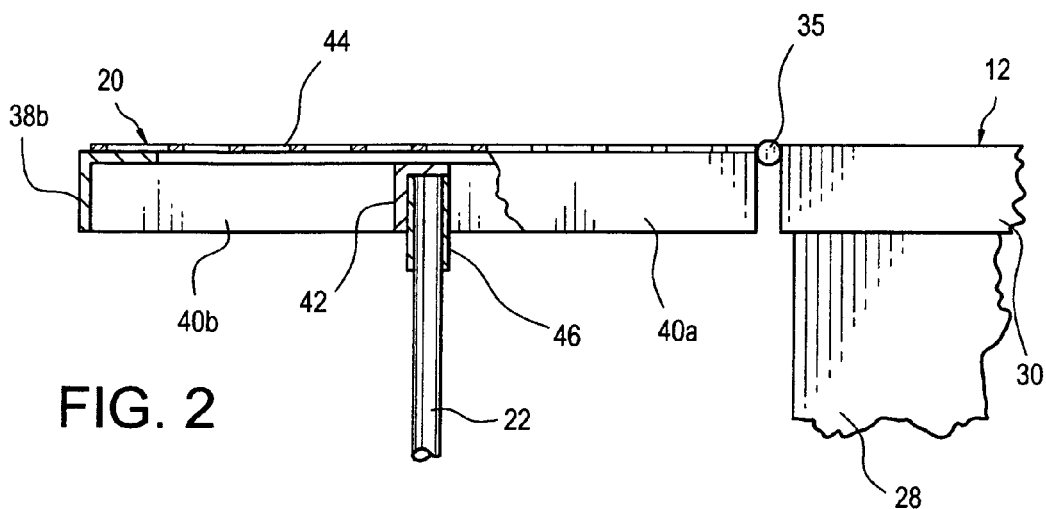
FIG. 2 is a side view of the toolbox platform with portions broken away to reveal construction details.

Referring now to the FIGS., a toolbox in accordance with the present invention is shown at 10. Toolbox 10 includes a rectangular enclosure 12 sized for easy positioning upon the bed 14 of a pickup truck 16 adjacent the truck cab 18. A platform 20 is hingedly attached to the top of enclosure 12 such that it can be pivoted outwardly from the side of truck 16 in a cantilevered manner. A support rod 22 is positioned beneath platform 20 to transmit loads to the ground 24.

Enclosure 12 includes a rectangular bottom wall 26 for positioning upon bed 14. Affixed to, and extending upwardly from, the periphery of bottom wall 26 is a side wall 28 having a height that is greater than that of the depth of bed 14. A lid 30, sized to close enclosure 12, is pivotally attached to the top of side wall 28 by means of a number of hinges 32. A handle 34 affixed to the rear of lid 30 to permit lid 30 to be easily elevated. A lock (not shown) can be provided to enclosure 12, if desired, to prevent the lifting of lid 30 and unauthorized access to the contents of enclosure 12.

Platform 20 includes a frame 36 having a pair of end members 38a, 38b connected together by a pair of side members 40a, 40b in a rectangular configuration. A medial member 42, remote from end members 38a, 38b connects the midpoints of side members 40a, 40b together so as to reinforce frame 36. As shown, members 38a, 38b, 40a, 40b and 42 are formed pieces of angle iron, however, other materials like square or round tubing and channel iron can be used.

A pair of hinges 35 joins platform 20 to enclosure 12. Each of hinges 35 is affixed at one of its ends to end member 38a and is affixed at the other of its ends to an end of lid 30. Hinges 35 are constructed and located in such a way that they permit platform 20, in an extended position, to project horizontally from closed lid 30. Further, hinges 32 permit platform 20, in a retracted position, to flip over, invert and rest atop lid 30.

Frame 36 supports, carries, and reinforces a perforated panel 44 that is rectangular in outline has the same lateral extent as frame 36. Panel 44 rests atop members 38a, 38b, 40a, 40b and 42 to which it is affixed as by welding. Panel 44 is formed of expanded metal mesh that is durable and permits water and dirt to fall through frame 36 and to the ground 24 instead of collecting and forming a slippery and dangerous condition.

A socket member 46 is affixed to the bottom of frame 36. Socket member 46 is a short tube that is affixed to the middle of medial member 42 such that its longitudinal axis is oriented at right angles to the top of frame 36 and panel 44. Alternatively, socket member 46 can be affixed in a similar manner to the middle of end member 38b.

Support rod 22 can be inserted into socket member 46 to support platform 20. Rod 22 has a length of about five or six feet, sufficient to maintain platform 20 in an extended, horizontal position as shown in FIG. 1. The diameter of rod 22 is sized to provide a snug, yet releasable, fit within socket member 46. To ensure that rod 22 cannot detach from socket member 46 during use, means (not shown) such as: threaded fasteners, retaining pins, and clips can lock rod 22 and socket member 46 together. If desired, the top of rod 22 and the interior of socket member 46 can be provided with compatible, helical threads so that the two parts can be screwed together.

Figure 3:
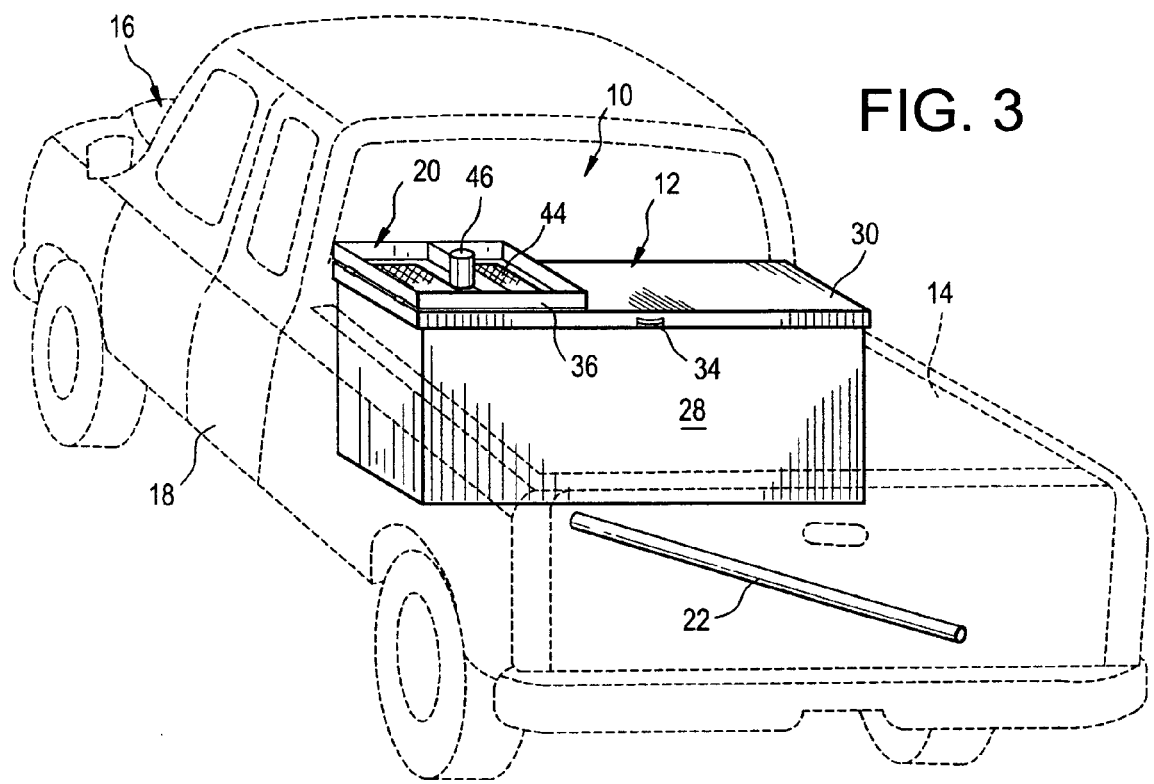
FIG. 3 is a perspective view of the toolbox being located on the bed of a pickup truck and having the platform of the toolbox in a retracted position.
Figure 4:
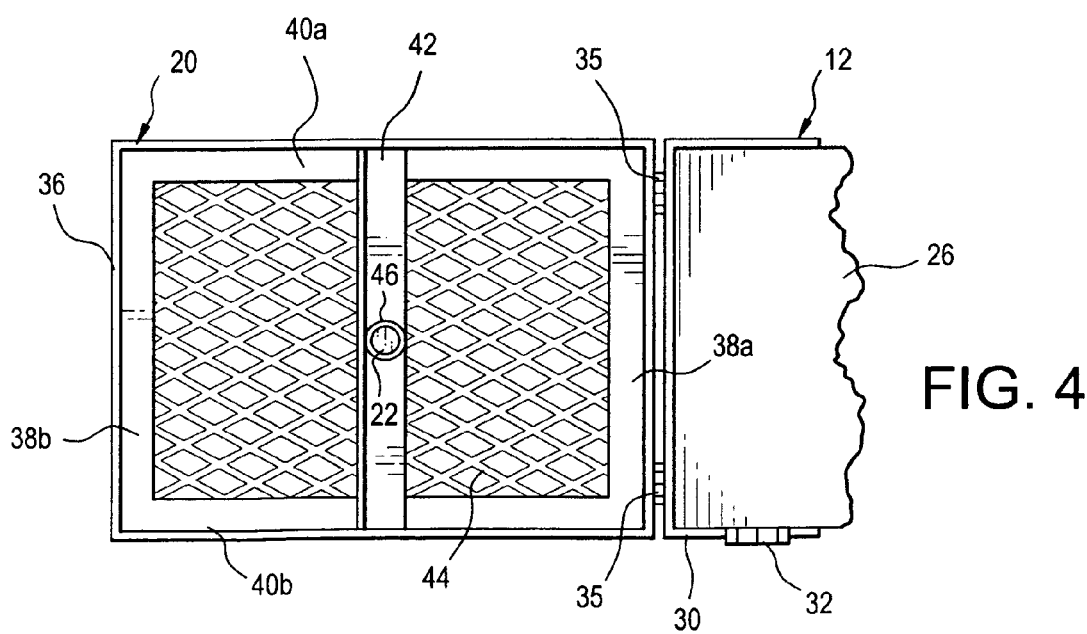
FIG. 4 is a bottom view of the toolbox platform with portions broken away.

The use of toolbox 10 is straightforward. First, enclosure 12 is positioned on bed 14 of truck 16 adjacent cab 18 so that lid 30 can be easily lifted by a user standing on bed 14. Then, with platform 20 positioned atop lid 30 and support rod 22 resting on bed 14 as illustrated in FIG. 3, truck 16 is driven to a spot where high access to a piece of equipment is needed and truck 16 is parked closely adjacent the equipment. Now, platform 20 is manually pivoted to the cantilevered position shown in FIG. 1. Next, the top of rod 22 is inserted into socket member 46 and the bottom of rod 22 in positioned on the ground 24 with rod 22 being oriented vertically. Finally, a user, now positioned atop enclosure 12, can step onto platform 20 and perform work easily upon the piece of equipment. When the work is completed, platform 20 can be repositioned atop lid 30 by reversing the steps outlined above and any tools needed to perform the work can be stored within enclosure 12. Toolbox 10 remains ready for later reuse.

While toolbox 10 has been described with a high degree of particularity, it will be appreciated by those skilled in the art that modifications can be made to it. Therefore, it is to be understood that the present invention is not limited merely to toolbox 10, but encompasses any and all toolboxes within the scope of the following claims.

I claim:

1. A toolbox, comprising:
 an enclosure adapted for positioning upon the bed of a pickup truck, said enclosure having a movable lid at the top thereof and said lid having opposed ends;
 a platform being hingedly attached to one of said opposed ends of said movable lid such that said platform can be pivoted outwardly from the side of the pickup truck in a cantilevered manner, said platform including:
  a rigid frame;
  a perforated panel being affixed to the top of said frame; and,
  a socket member being affixed to the bottom of said frame; and,
 a support rod being releasably attached to said platform for transmitting cantilevered loads to the ground, the top of said support rod being slidably positioned within said socket member.

\* \* \* \* \*